United States Patent
Ghosh et al.

(10) Patent No.: US 7,130,712 B1
(45) Date of Patent: Oct. 31, 2006

(54) METHOD AND SYSTEM FOR SMALL-LOT ORDERS TO OPTIMIZE PRODUCTION RUNS IN THE STEEL INDUSTRY

(75) Inventors: Soumyadip Ghosh, New York, NY (US); Jayant Ramarao Kalagnanam, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/139,668

(22) Filed: May 31, 2005

(51) Int. Cl.
*G06F 19/00* (2006.01)
(52) U.S. Cl. ........................................ 700/146; 705/28
(58) Field of Classification Search .............. 700/146, 700/171, 149; 705/28
See application file for complete search history.

(56) References Cited

U.S. PATENT DOCUMENTS

| | | | | |
|---|---|---|---|---|
| 5,897,624 | A * | 4/1999 | Ramaswamy | 705/28 |
| 6,321,132 | B1 * | 11/2001 | Dawande et al. | 700/97 |
| 6,684,117 | B1 * | 1/2004 | Bacin et al. | 700/98 |
| 2001/0049634 | A1 * | 12/2001 | Stewart | 705/26 |
| 2003/0078765 | A1 * | 4/2003 | Hoffmaster | 703/22 |
| 2003/0101107 | A1 * | 5/2003 | Agarwal et al. | 705/28 |
| 2003/0195648 | A1 * | 10/2003 | Bacin et al. | 700/100 |
| 2004/0158340 | A1 * | 8/2004 | Fischer et al. | 700/97 |
| 2005/0060246 | A1 * | 3/2005 | Lastinger et al. | 705/28 |

OTHER PUBLICATIONS

Barnes et al., "A simulation model for production scheduling of a facility in a process industry", 1990, Proceedings of the winter simulation conference, pp. 609-613.*

Lee et al., "Primary production scheduling at steelmaking industries", 1996, IBM J. Res., pp. 1-22.*

* cited by examiner

*Primary Examiner*—Leo Picard
*Assistant Examiner*—Chad Rapp
(74) *Attorney, Agent, or Firm*—Whitham, Curtis, Christofferson & Cook, PC; Stephen C. Kaufman

(57) ABSTRACT

Steel making is a batch production process in which batches of 250 tons, called charges or heats, are grouped together in a single production run, called a cast. Because of fixed costs and downtime associated with cleanup and setup between casts, a cast of less than three charges is likely to be inefficient. As a result, short-run orders (such as, for example, orders of less than 750 tons) may present efficiency problems. The present invention transforms the operation from a make-to-order model to a make-to-stock model, enabling orders to be clustered based on considerations such as grade and geometry to maximize the number of clusters that satisfy the cast-size constraint.

10 Claims, 4 Drawing Sheets

METHOD AND SYSTEM FOR SMALL-LOT ORDERS TO OPTIMIZE PRODUCTION RUNS IN THE STEEL INDUSTRY

BACKGROUND OF THE INVENTION

1. Field of the Invention

The present invention generally relates to steel manufacturing and, more particularly, to a method and system for optimizing small-lot production runs in the steel industry by adopting a make-to-order model for steel slab production and using order-planning and production-planning tools to identify appropriate clusters of orders and then balancing the size of the clusters in an effort to maximize the number of clusters that satisfy optimal production-run size constraints.

2. Background Description

Steel manufacturing is a three-part process that begins with making large slabs of steel from iron ore (and/or recycled steel) and coal and other materials. Once the steel is made, it is rolled and finished.

The production of slab steel is a batch process in which production runs involve extremely large quantities of material. Steel slabs are typically produced in 250-ton batches, called charges or heats. A single production run, known as a cast, preferably involves the production of multiple charges of the same grade of steel.

Steel producers prefer to run multiple charges per cast because there are significant fixed costs and downtime associated with cleanup and setup between casts. As a result, it is inefficient to have frequent changeovers from one cast to another. In addition, the downtime associated with cleanup and setup between casts will hurt capacity utilization rates are too small. Steel makers, therefore, plan for casts to be as large as possible in order to minimize changeover costs and maximize capacity utilization.

There is a noticeable threshold of efficiency at casts of at least 750 tons, creating a strong preference for casts of at least three 250-ton charges. When the number of 250-ton charges in a cast is less than three, there is a noticeable negative impact on productivity.

One solution to the problem of attaining appropriate scale in slab steel making is to increase the size of small-lot orders by making more and holding the excess amount in inventory. Such a solution is less than ideal, however, in part because of the made-to-order nature of the steel industry.

Steel manufacturing has traditionally been a made-to-order business in which steel is made, rolled, and finished in a continuous process with a particular customer's order in mind. The solution to small-lot order problems has been to increase the size of the casts to at least three charges by making, rolling, and finishing (or semi-finishing) more steel than a customer has ordered, with the excess portion being carried in inventory until a customer is found. Thus, the customer-ordered steel and the steel made for inventory are not decoupled until after the finishing process.

The present invention, recognizing the steel industry's need for large production runs and the expense of carrying inventory, offers a solution to enable steel producers to better optimize production runs.

SUMMARY OF THE INVENTION

It is thus an object of the present invention to provide a method and system for small-lot orders to optimize production runs in the steel industry. Prior-art solutions to small-lot order problems have been less than completely satisfactory for the steel industry, in part because rolling and finishing are not subject to the same economies of scale as slab steel making in terms of optimal production runs and capacity utilization. Production of excess steel to achieve efficiencies in slab steel making does not create efficiencies in rolling and finishing and may actually create inefficiencies in those operations, especially when the rolling and finishing processes results in a steel for which there is only limited demand.

The present invention forms clusters of steel orders, so that it becomes necessary to maintain inventory only for such clusters, rather than for each and every possible steel order requirement. The clustering approach according to the present invention is driven by certain specific steel production related constraints: (i) chemical grade mixability (i.e., orders with similar grades can be made off the same slab), relying on later processes in the production line to change the grade as required; (ii) sequenceability (i.e., orders with similar geometry requirements can be sequenced to be produced off the same slab and coil etc.), relaying on later processes in the production line to customize steel to the order requirements later in the production line; and (iii) maximizing the number of clusters that have a minimum inventory reorder size in terms of weight that is close to a multiple of the "optimal" cast charge size of the slab caster (e.g., optimal size could be three casts of 250 tons each, or 750 tons at a time).

Also according to the present invention, inventory may be held for each cluster separately.

Inventory may be held for many different geometries for each cluster, and inventory holding capabilites of steel plants may make it possible to stack similar geometries, belonging to the same cluster, together. Holding slightly different geometries together may help meet future demands more accurately or reliably. (Notwithstanding, there may be a constraint limiting aggregate inventory for all geometries for a cluster to some specified amount, and such a constraint may also be applied over all clusters.)

In addition, inventory may be held for each cluster at any point in the production line. A production line that progressively converts raw ore to steel according to order-specified requirements goes through multiple processing stages, and inventory can effectively be taken off-line and held anywhere along the production process. The further along a production line steel is taken off-line to be held as inventory, the more finished it is and the less its characteristics may readily be changed to meet requirements of new orders. However, orders that can be fulfilled from more finished inventory, which is held at later points along the production line, can be filled more quickly than would be possible if the inventory had to be pulled in from an earlier stage of the production process. Thus, determining at what stage of the production process inventory is to be held involves important tradeoffs.

According to the present invention, simulation explores tradeoffs involving holding inventory at various locations and holding inventory in various geometries, and this is done for each cluster. Simulation analysis is done in successful runs to determine geometries, locations, and quantities of inventory to be held for each cluster in order to obtain the best balance between costs and customer satisfaction. Inventory re-order levels, and so forth, can be set according to established literature.

In the present invention, therefore, slab steel making becomes organized on a make-to-store model instead of the make-to-order model used in the past, while rolling and finishing remain organized on a make-to-order model. In other words, slab steel is made to store, i.e., produced and then held in inventory until needed. Small-lot orders are then filled by taking slab steel from inventory and then rolling and finishing the steel according to customer requirements.

Because rolling and finishing do not present the same issues as slab steel making in terms of production-run economies, cost savings may be achieved by producing slab steel on a make-to-stock basis, while performing rolling and finishing operations based on customer requirements on a make-to-order basis. Because slab steel of a certain grade and geometry may be rolled and finished to a variety of end-user requirements, there is less variety in slab steel than there is in steel that has been rolled and finished. As a result, an inventory of slab steel may be managed more efficiently than an inventory of steel that has been rolled and finished.

The present invention also permits the slab steel making, once it has been decoupled from rolling and finishing operations, to be optimized using demand planning methodologies that could not be applied to steel making based on the old make-to-order model.

This is accomplished by employing computer-implemented order-planning and production-planning tools to identify appropriate groups, or clusters, of orders based on grade and geometry considerations and then balancing the size of the clusters in an effort to maximize the number of clusters that satisfy the optimal cast size constraint of the slab steel making process. This solution uses a three-part framework of analyzing demand, applying an inventory policy, and employing simulation studies to evaluation and adjust the inventory policy.

Demand analysis involves the identification of orders from various customers, which may categorized according to time intervals such as day, hour, or other appropriate intervals. For small-lot orders, historical data may be considered to determine the frequency of similar orders, such as every six months, every, twelve months, and so forth. Next, an order aggregation is performed using a clustering analysis involving the grade and geometry of the steel required. For each cluster, a demand may then be characterized, including such data points as inter-arrival time and order characteristics (e.g., weight, geometry), as a stochastic process (for example, a Poisson process.)

Inventory policy may be established for each cluster to identify and apply a reorder point at which additional slab steel will be made-to-stock once on-hand inventory dips to an established threshold. Inventory theory may be employed to determine the reorder point based on service level, supply lead time, order arrival process, and charge size. Continuous or periodic review of inventory levels may be employed.

Simulations may be employed to evaluate and adjust each cluster's inventory policy. Simulation analysis according to the present invention determines geometries, locations, and quantities of inventory to be held for each cluster in order to obtain the best balance between costs and customer satisfaction. For each cell in a demand matrix for a given cluster, an order generator may be simulated based on stochastic characterization. An order book for the order arrival process may then be created on a day-by-day basis, with inventories being maintained for each demand type based on aggregation. Small-lot orders may then be satisfied from inventory, and requests for cast design may be generated based on inventory policy. For example, a predetermined quantity may be ordered when on-hand inventory reaches the reorder point, and current demand may be run with small-lot charges fixed. Finally, performance metrics may be analyzed in terms of planned surplus, service levels, and so forth.

Inventory-based manufacturing confronts certain issues specific to steel making, which do not arise in other industries. In many industries, such as semiconductors, products are essentially interchangeable, so that multiple orders may be matched to a single unit of inventory. In steel, by contrast, products typically differ in terms of geometry, such as width and thickness, so that multiple orders are to be matched to multiple units of inventory. In addition, inventory-based manufacturing in the steel industry must deal with packing multiple orders to a single piece of inventory, grade substitution, and a heightened need to minimize both waste and partial surplus.

Demand planning for inventory in the steel industry, therefore, means managing variety. There is a large number of finished products, such as cold rolled steel, hot rolled steel, galvanized steel, and so forth; furthermore, geometry introduces many additional varieties. Inventory in a make-to-store model of the steel industry is generally semi-finished forms such as slab inventory and hot rolled coils in order to control variety due to geometry. A further key consideration is storage. Slabs of same geometry should be stacked together, and there are limit on number of slab geometries that can be stored.

Slab geometry selection is significant optimization problem to be addressed in demand planning in the steel industry, primarily due to inventory space requirements. Cast design must also be optimized in view of inventory policy. Appropriately structured volume discounts may play a vital role in solving demand management problems.

The present invention may aid in the management of distribution networks by enabling the realignment of geographic demand, facilitating the optimization of allocation constraints, improving volume discount structures, and enabling market mechanism to be employed to redistribute demand.

Each distributor's profit structure is private information which is unknown to a steel manufacturer, making preference aggregation difficult. Market mechanisms, however, may provide a tool for preference aggregation by permitting the reallocation of supply across various bids based on constraints such as number of distributors per region, number of distributors per product, and minimum size of distributor per region.

Auction theory and game theory may also be employed in connection with demand distribution according to the present invention.

Thus, the present invention provides a computer-implemented method for managing efficient production runs of small-lot steel orders, comprising the steps of: analyzing a history of small-lot steel orders using a clustering analysis in which clusters are defined in terms of grade, geometry, and quantity of slab steel required for groups of orders; generating a stochastic characterization of demand for each cluster, including arrival time and order characteristics, based on historical experience; classifying incoming steel orders by cluster in terms of grade, geometry, and quantity of slab steel required to fill each order; establishing an inventory policy for each cluster so that inventory is reviewed and an order is placed for additional inventory when on-hand inventory reaches a predetermined reorder point; and generating a signal that it is time to order slab steel conforming to the cluster's grade and geometry when a reorder point is reached.

According to the present invention, the stochastic characterization of demand may be generated using a Poisson process. In addition, the review of inventory levels according to the inventory policy may continuous or periodic. Factors used to determine the reorder point may include one or a plurality of inventory maintenance costs, expected service level, supply lead time, order arrival process, and charge size, as well as other factors.

The inventory policy according to the present invention may be subjected to a simulation study, comprising: simulating an order generator for each cluster based on a stochastic characterization of demand which has been generated for the cluster; creating simulated orders; maintaining simulating slab steel inventory; satisfying simulated orders from simulated inventory; placing a simulated order for additional inventory when the reorder point is reached; determining whether holding inventory for each cluster at currently chosen points on said steel production line and implementing made-to-stock inventory policies at said points results in a balance between operating costs and and requirements of incoming orders; and accepting a policy of holding inventory at currently chosen locations on said production line if said simulation study results in a satisfactory balance between inventory and requirements of incoming orders, but resetting a policy by changing inventory holding locations on said production line and re-subjecting the reset policy to a new simulation study if said balance is found to be unsatisfactory.

Finally, according to the method of the present invention, the signal to order slab steel according to the inventory policy may initiate an automatic reordering of slab steel or may notify a human operator of the need to reorder slab steel.

The present invention also provides a system for optimizing production runs of small-lot steel orders, comprising: a database of historical steel orders, including grade and quantity of slab steel required for each order, which may be analyzed using a clustering analysis in which clusters are defined in terms of grade and quantity of slab steel required for groups of orders; a computer generating a stochastic characterization of demand for each cluster, including timing and order characteristics, based on historical experience; a computer receiving incoming steel orders and classifying said orders by cluster in terms of grade and quantity of slab steel required to fill each order; a computer establishing an inventory policy for each cluster so that inventory is reviewed and an order is placed for additional inventory when on-hand inventory reaches a predetermined reorder point; and a computer generating a signal that it is time to order slab steel conforming to the cluster's grade and geometry when a reorder point is reached.

A computer may be employed according to the system of the present invention to subject the inventory policy to a simulation study, such that inventory policy is reset and again subjected to a simulation study if the results of the simulation study indicate that the inventory policy does not result in a balance between inventory and requirements of incoming orders.

Finally, according to the system of the present invention, the signal to order slab steel according to the inventory policy may initiate an automatic reordering of slab steel or may notify a human operator of the need to reorder slab steel.

Principal advantages of the method and system of the present invention are to improve both the serviceability of the orders, and the productivity of the casters.

BRIEF DESCRIPTION OF THE DRAWINGS

The foregoing and other objects, aspects and advantages will be better understood from the following detailed description of a preferred embodiment of the invention with reference to the drawings.

DETAILED DESCRIPTION OF A PREFERRED EMBODIMENT OF THE INVENTION

Figure 1:
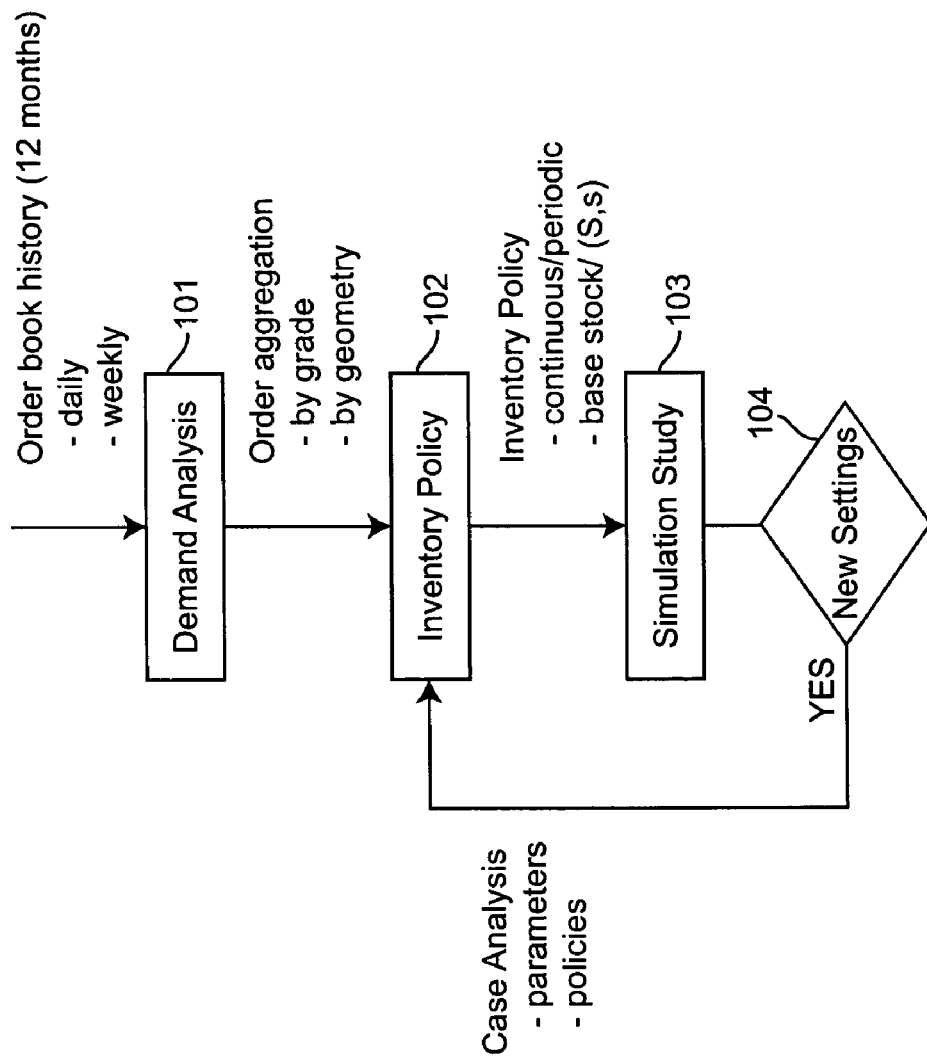
FIG. 1 describes a solution framework according to the present invention.

Referring now to FIG. 1, there is shown a solution framework in which a 12-month order book history is subjected to demand analysis in step 101, producing order aggregation by grade and geometry. An inventory policy is then established in step 102, pursuant to which slab steel stock is reordered when a review of inventory, which may be done on a continuous or a periodic basis, indicates that a reorder point has been reached. A simulation study is performed in step 103 to determine whether inventory parameters and/or policies should be reset, as in step 104. If new settings are appropriate, then the inventory policy is reestablished as in step 102; otherwise, the solution framework process is completed.

Figure 2:
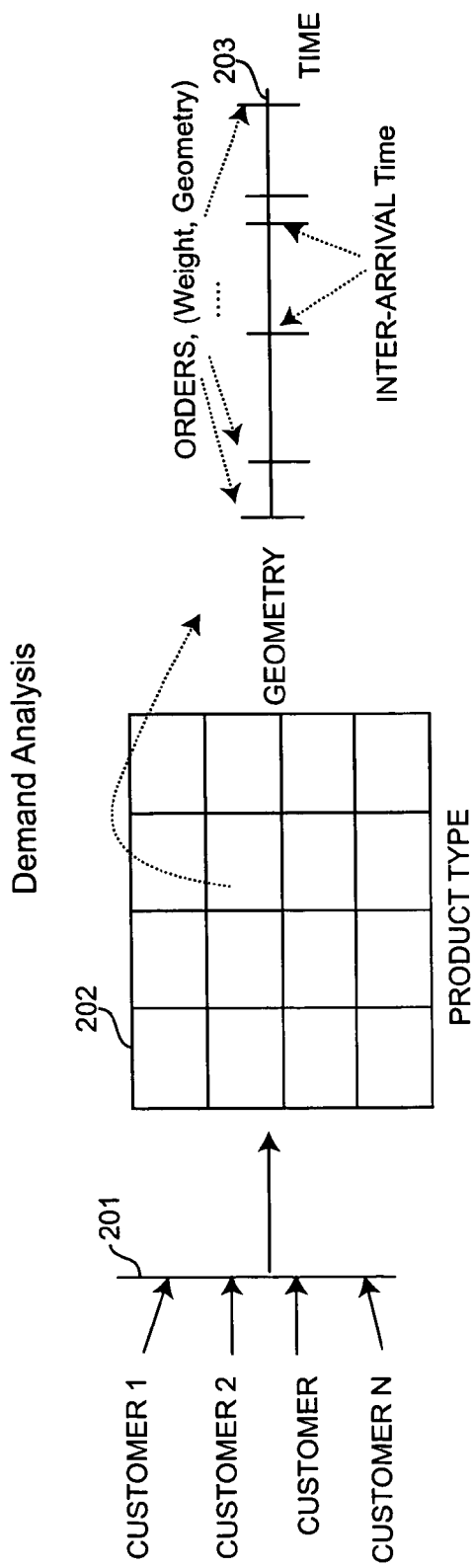
FIG. 2 describes a demand analysis according to the present invention.

Referring to FIG. 2, there is shown a demand analysis in which orders from various customers arrive in each time interval (such as daily or hourly) and are evaluated in terms of historical data for small lots (such as data covering the last six or 12 months). Based on such data, these orders are combined in step 201 and then aggregated using a clustering analysis in terms of product type (substitution for grade) and geometry (packing, trimming etc) into a multi-cell matrix in step 202, after which a stochastic characterization of demand is generated in step 203 for each cluster, corresponding to each cell of the matrix generated in step 202, stochastically characterized by inter-arrival time and order characteristics (weight, geometry), such as may be done by a stochastic process such as a Poisson process.

Figure 3:
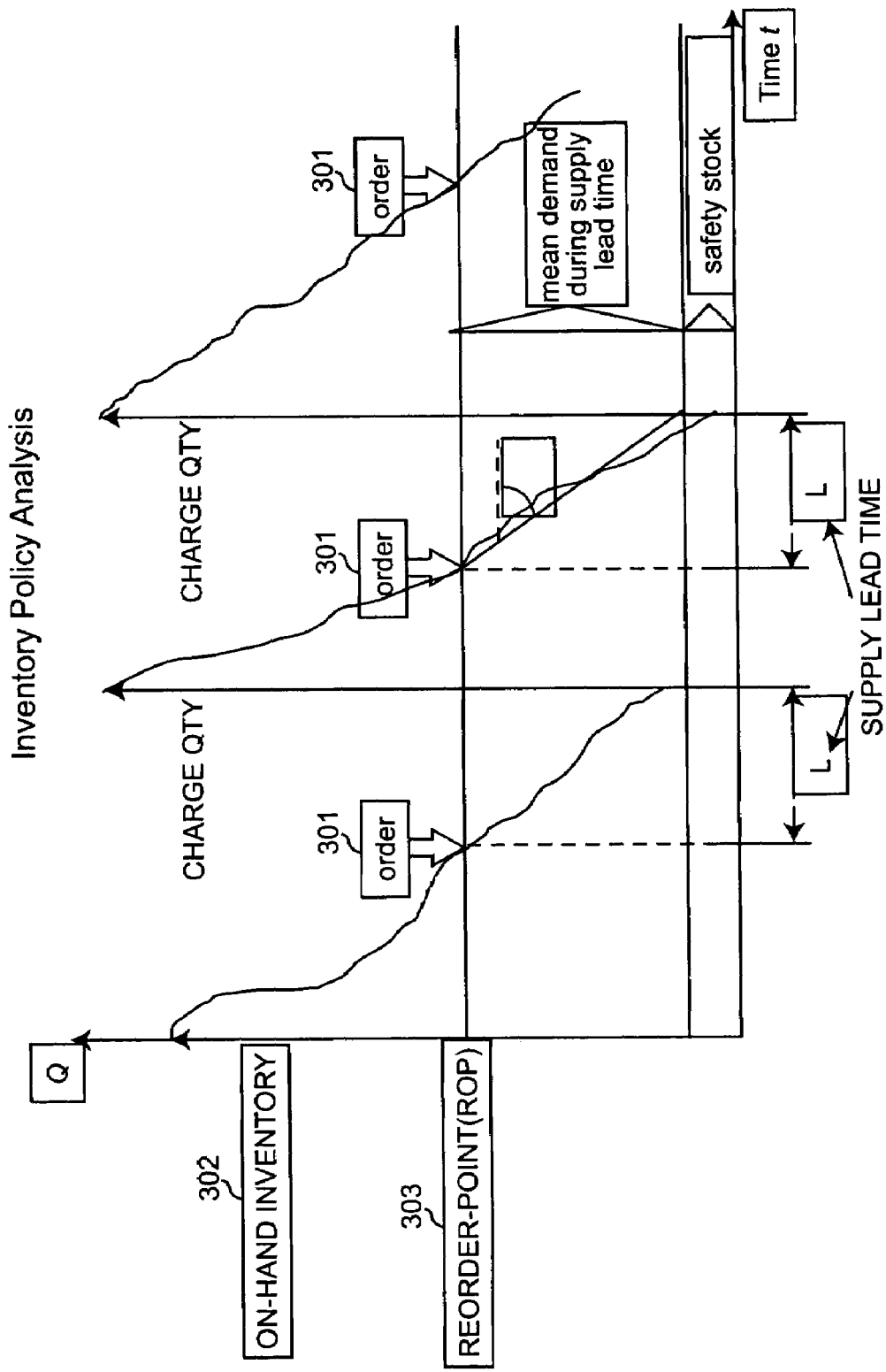
FIG. 3 describes an inventory policy analysis according to the present invention.

Referring to FIG. 3, a graph using axes of time and quantity is shown to represent an inventory policy analysis employing continuous review of inventory in which order quantities are fixed in terms of charge size or cast size and a reorder point needs to be determined for each cluster. The reorder point is determined using inventory theory based on service level (e.g., 95%), supply lead time (L) estimated from current demand, order arrival process, and charge size. Thus, an order 301 is placed when on-hand inventory 302 equals the reorder point 303.

Figure 4:
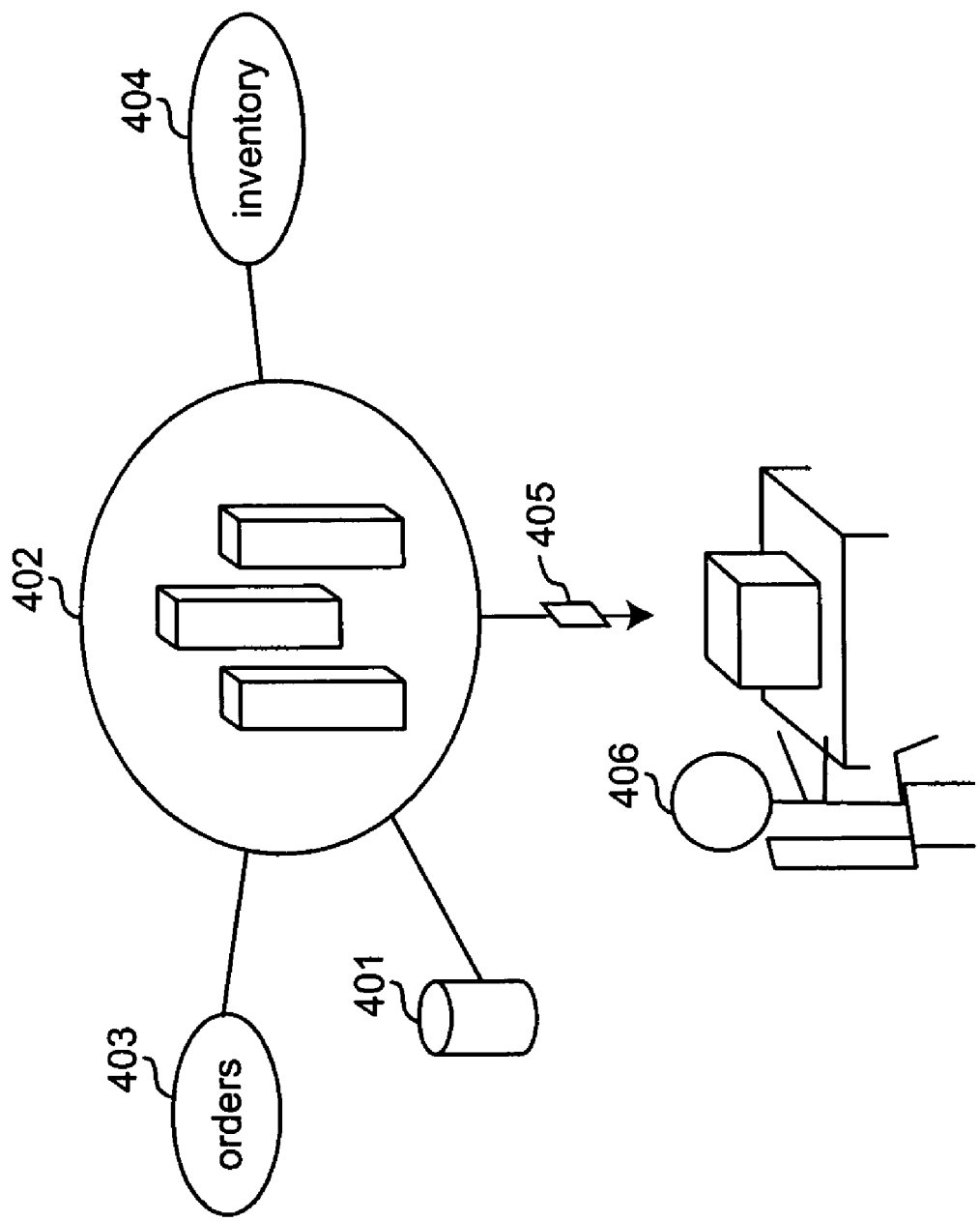
FIG. 4 represents a computer-based system according to the present invention.

Referring to FIG. 4, there is a database 401 of historical steel orders, connected to a computer network 402 which generates a stochastic characterization of demand for each cluster. The computer network 402 also receives incoming steel orders 403, classifies said orders by cluster in terms of grade and quantity of slab steel required to fill each order. The computer network 402 further establishes an inventory policy for each cluster so that inventory 404 is reviewed and an order is placed for additional inventory when on-hand inventory reaches a predetermined reorder point. Finally, when the reorder point is reached, the computer network 402 generating a signal in the form of an email 405 notifying a human operator 406 that it is time to order slab steel conforming to the cluster's grade and geometry.

While the invention has been described in terms of a single preferred embodiment, those skilled in the art will recognize that the invention can be practiced with modification within the spirit and scope of the appended claims.

The invention claimed is:

1. A computer implemented method for managing production runs of small-lot steel orders, comprising the steps of:
analyzing a history of small-lot steel orders to create clusters of similar orders using a clustering analysis in which clusters are defined in terms of grade, geometry, and quantity of slab steel required for groups of orders, said analysis addressing at least the following concerns: (i) similarity in terms of chemical grade, (ii) similarity in terms of geometry of steel required at various stages of processing this order, and (iii) maximizing the number of clusters that have a total order quantity that is close to a multiple of the optimal weight of charge casts supported by a particular steel caster in a production line;
generating a stochastic characterization of demand for each cluster, including arrival time and order characteristics, based on historical experience;
classifying incoming steel orders by cluster in terms of grade, geometry, and quantity of slab steel required to fill each order;
establishing an inventory policy for each cluster at preselected points along the steel production line so that inventory is reviewed and an order is placed for additional inventory when on hand inventory reaches a predetermined reorder point;
generating a signal to order slab steel conforming to the cluster's grade and geometry when a reorder point is reached; and
subjecting said inventory policy to a simulation study, comprising
simulating an order generator for each cluster based on a stochastic characterization of demand which has been generated for the cluster,
creating simulated orders,
maintaining simulating slab steel inventory,
satisfying simulated orders from simulated inventory,
placing a simulated order for additional inventory when the reorder point is reached,
determining whether holding inventory for each cluster at currently chosen points along said steel production line and implementing made-to-stock inventory policies at these points results in a balance between operating costs and requirements of incoming orders, and
accepting a policy of holding inventory at currently chosen locations on the production line if said simulation study results in a satisfactory balance between inventory and requirements of incoming orders, but resetting a policy by changing the inventory holding locations on said production line and re-subjecting the reset policy to a new simulation study if said balance is found to be unsatisfactory.

2. The computer-implemented method of claim 1 wherein the step of generating a stochastic characterization of demand is performed using a Poisson process.

3. The computer-implemented method of claim 1 wherein the review of inventory levels according to the inventory policy is continuous.

4. The computer-implemented method of claim 1 wherein the review of inventory levels according to the inventory policy is periodic.

5. The computer-implemented method of claim 1 wherein factors used to determine the reorder point include one or a plurality of inventory maintenance costs, expected service level, supply lead time, order arrival process, and charge size.

6. The computer-implemented method of claim 1 wherein the signal to order slab steel according to the inventory policy initiates an automatic reordering of slab steel.

7. The computer-implemented method of claim 1 wherein the signal to order slab steel according to the inventory policy notifies a human operator of the need to reorder slab steel.

8. A system for optimizing production runs of small-lot steel orders, comprising:
a database of historical steel orders, including grade, geometry, and quantity of slab steel required for each order, which may be analyzed using a clustering analysis in which clusters are defined in terms of grade, geometry, and quantity of slab steel required for groups of orders, said analysis addressing at least the following concerns: (i) similarity in terms of chemical grade, (ii) similarity in terms of geometry of steel required at various stages of processing this order, and (iii) maximizing the number of clusters that have a total order quantity that is close to a multiple of the optimal weight of charge casts supported by a particular steel caster in a production line;
a computer generating a stochastic characterization of demand for each cluster, including timing and order characteristics, based on historical experience;
a computer receiving incoming steel orders and classifying said orders by cluster in terms of grade, geometry, and quantity of slab steel required to fill each order;
a computer establishing an inventory policy for each cluster so that inventory is reviewed and an order is placed for additional inventory when on hand inventory reaches a predetermined reorder point;
a computer generating a signal that it is time to order slab steel conforming to the cluster's grade and geometry when a reorder point is reached; and
a computer subjecting the inventory policy to a simulation study, such that inventory policy is reset and again subjected to a simulation study if the results of the simulation study indicate that the inventory policy does not result in a balance between inventory and requirements of incoming orders.

9. The system of claim 8 wherein the signal to order slab steel according to the inventory policy initiates an automatic reordering of slab steel.

10. The system of claim 8 wherein the signal to order slab steel according to the inventory policy notifies a human operator of the need to reorder slab steel.

* * * * *